June 11, 1935.     A. W. SIMON     2,004,352

ELECTROSTATIC GENERATOR

Filed July 5, 1933     4 Sheets-Sheet 1

Inventor
Alfred W. Simon.
Attorney.

June 11, 1935.  A. W. SIMON  2,004,352
ELECTROSTATIC GENERATOR
Filed July 5, 1933  4 Sheets-Sheet 2

Inventor
Alfred W. Simon.

Attorney

Patented June 11, 1935

2,004,352

UNITED STATES PATENT OFFICE 2,004,352

ELECTROSTATIC GENERATOR

Alfred W. Simon, Eagle River, Wis.

Application July 5, 1933, Serial No. 679,074

6 Claims. (Cl. 171—329)

This invention has general reference to electrostatic generators, or devices for producing an electrostatic difference of potential by mechanical transportation of electric charges against the gradient of potential of an electrostatic field. Such electrostatic generators as I have reference to may be known as static machines, or as voltage multipliers, depending upon the manner in which they are used. The essential principle of operation, however, is the same in either case, as will be brought out hereinafter, and the two forms of the devices are properly classed together under the name of electrostatic generator. The present invention will accordingly be described with both forms in view.

In static machines as heretofore constructed, the carrier element, or elements, whose function it is to physically transport or carry the electric charges against the gradient of potential, consists usually of a rotating disc of dielectric, with or without metallic sectors (depending on the type of machine, i. e. whether it is a sectorless or sectored machine). The electric charges are either induced directly on the metallic sectors or deposited on the surface of the sectors or the surface of the rotating disc by means of gaseous ionization (corona) produced in the space between the surface of the sector or disc and the "comb" of the neutralizing rod placed near. In the first case, where the charges are directly induced on the sectors, the brush of the neutralizing rod makes direct contact; in the other, where gaseous ionization is utilized, the brushes or combs of the neutralizing rod are out of contact with but near the sectors. The essential function of the carrier or carriers, after charge is induced on them, is to transport this charge away from the vicinity of the inductors, drawing it away against the attraction of the charge on the inductors, and so doing work which appears as increased electrical energy and therefore increased difference of potential between inductors and carriers. The charge in the case of sectored machines is carried in the form of charges residing on the surfaces of the sectors; in the case of sectorless machines, as charges residing on the surface of the rotating dielectric plate or disc.

The current delivered by such a machine is proportional, other things being equal, to the speed of the carrier or carriers, and it is therefore desirable to increase the speed of the rotating plate (which either forms the carrier itself, in the case of sectorless machines, or is the vehicle by which the metallic sectors are carried around, in the case of sectored machines) as much as possible. However, since this plate must be composed of a solid dielectric material, such as glass, ebonite, etc., it is difficult, due to the low tensile strength of such substances, to drive them at the great speeds without danger of breakage.

Also in order to increase the voltage delivered by such a machine it is necessary to increase the diameter of the rotating plate, which again necessitates slower speeds and greater expense due to the difficulty of manufacturing large discs of solid dielectric material (e. g. Pyrex glass).

It is a primary object of my invention to provide an improved static machine, or more generally speaking, an improved electrostatic generator, and especially one wherein the usual moving solid dielectric carrier of the electric charges is eliminated.

Instead of utilizing the usual comparatively large, solid dielectric carrier member for the electric charges, my invention employs a gaseous carrier, the electric charges existing in the form of electrically charged particles or ions (gas ions or finely divided liquid or solid particles suspended in a gas) carried or propelled up the grade of potential by a forced circulation of this gaseous carrier. It will readily be seen that this method allows very high speeds to be attained and so permits large currents to be delivered. Also the departure from a large moving solid dielectric greatly simplifies the insulation of the various parts of the machine, since it is not necessary to employ insulation materials of great mechanical strength. Also it is not difficult or expensive to construct machines of this type on a considerable scale—an imperative requirement if high voltages are to be obtained. Furthermore, the use of a gas as the carrier greatly reduces the leakage which always occurs along the surface of dielectric plates due to their imperfect insulating qualities. As is well known a gas is a much more perfect insulator than most solid substances.

The ways in which the invention can be carried out are various, the essential feature in each case being, however, a forced and confined circulation of a gas containing electrically charged particles, which may be either gas ions, or charged foreign particles carried along by the gas. In order to demonstrate how the invention may be carried out a number of designs of machine will be described, although it must be understood that the broader aspects of the invention are not to be limited to the particular forms of machine described, since any form of machine employing a forced circulation of a confined gas containing electrically charged particles will fall under the broad scope of this invention.

Several possible forms of the invention are shown in the accompanying drawings, wherein.

Figures 1, 2, 3:
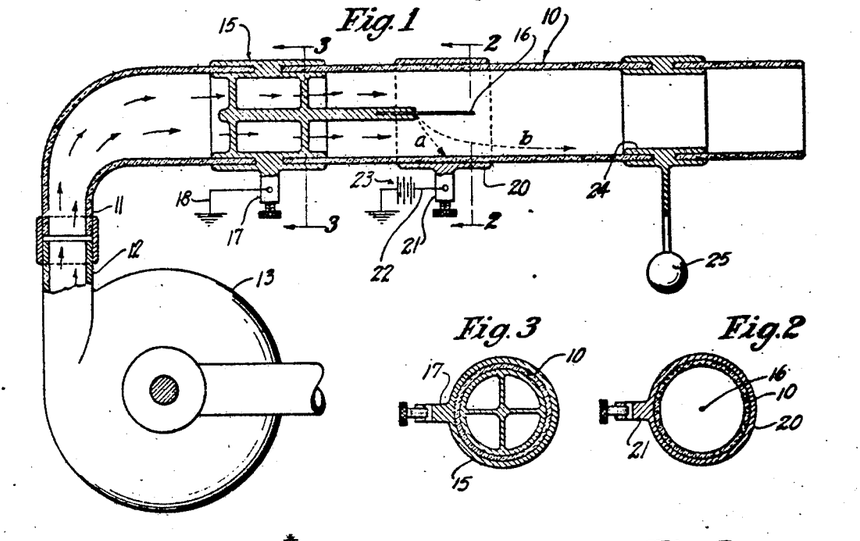
Fig. 1 is a length section of a simple form of the invention.
Fig. 2 is a transverse section on line 2—2 of Fig. 1.
Fig. 3 is a transverse section on line 3—3 of Fig. 1.

Fig. 1 shows a simplified embodiment of the invention in a form which may be considered as a voltage multiplier. Numeral 10 designates a dielectric insulating tube, of Pyrex glass or other suitable material, connected at its inlet end 11 with a tube 12 leading from a suitable fan or blower, conveniently designated at 13. In Fig. 1 the opposite end of tube 10 is shown as discharging to atmosphere, although if desired the tube may be arranged for closed circulation in the manner hereinafter disclosed in connection with Fig. 6.

Insulating tube 10 carries near its inlet end a support 15 for an ionizing electrode 16, the electrode here shown being in the form simply of a centrally mounted wire, although it may take other forms such as those hereinafter described. The electrode support, which is preferably electrically conductive, is shown with a binding post 17 for an electrical ground connection 18 for the electrode. Around tube 10 opposite electrode 16 is the inductor 20, here shown in the form of a metallic cylinder on the outside of the tube, although the inductor may be and often preferably is on the inside as hereinafter mentioned. This inductor is shown with a binding post 21, to which is connected a wire 22 leading to a battery 23 or other means for producing a difference of potential, the other side of the battery being grounded. This source of electromotive force is of advantage, though not basically essential in all cases, and the device will first be considered without it. At 24, at an appropriate distance beyond the electrode and surrounding inductor, is a collector, and the collector may be simply another conductor passing through the wall of the insulating tube beyond the inductor in the direction of gas circulation, although a comb type collector substantially as used on the usual rotating disc static machine, or a Faraday cage (metallic cylinder with ends closed by discs of wire screen) may be used to advantage. The form here shown is simply a conductive cylinder placed in the wall of tube 10. The collector is shown provided with a discharge ball 25.

A vigorous circulation of the gas in the insulating tube is maintained by the blower or pump. As is evident from Fig. 1, the direction of this circulation is from the inductor 20 to the collector 24. The ionizing electrode 16 is permanently grounded and the inductor 20 is given initially a sufficient charge to produce gaseous ionization or corona at the surface of the ionizing electrode 16. The apparatus then functions as follows:

Let it be supposed that the inductor 20 is given a positive charge of sufficient magnitude to produce gaseous ionization or corona within the circulating gas in the zone immediately surrounding the inner ionizing electrode 16. The application of this charge to the inductor creates an electrostatic field between the inductor and the ionizing electrode 16, and due to the relative physical shapes and areas of the inductor and electrode, and the fact that the radius of curvature of the former is much greater than the radius of curvature of the latter, this field will be of much higher gradient at the side adjacent the small ionizing electrode than at the side adjacent the inductor. The charge applied to inductor 20 (or the potential difference between inductor and electrode) must be sufficient to produce an electrostatic field adjacent electrode 16 which is sufficiently high to produce gaseous ionization or corona in a layer or zone about that electrode; and the existence of this condition means that in a zone near the electrode both positively and negatively electrified gas particles or ions are produced. If there were no circulation of gas the negative ions, due to the attraction of the positively charged inductor, would migrate across and attach themselves to the inner wall of the dielectric tube next to the inductor, while the positive ions, due to the repulsion exerted on them by the positively charged inductor, would be driven in to the inner electrode. When a sufficient number of the negative ions had migrated across and attached themselves to the inner wall of the tube, the corona would stop, for then the electric charge of the inductor would be "bound" by an equal and opposite charge on the inner wall of the tube and could exert no effect on the ionizing electrode to produce further ionization or corona—that is to say, under these conditions the system would come to equilibrium. I would then have essentially a charged condenser, of which the inductor formed one plate, the inner wall of the tube the other, and the material of the tube the dielectric. The result could also be described by saying that the charge of the ionizer had leaked across to the inner surface of the wall of the glass tube.

However, with a circulating instead of a stationary gas, the negative ions, as they attempt to migrate across toward the inductor, are caught by the gas stream and are swept along by it, the relatively low gradient field adjacent the inductor being of insufficient intensity to move the ions to the inductor in the presence of the gas stream up the tube. Thus, instead of travelling across the tube and lodging on the inner wall next to the inductor, the negative ions are carried along the tube in the direction of circulation of the gas. The positive ions of course are attracted by the high gradient field adjacent the inner electrode and are held by the inner electrode, and are thus not carried up the tube by the gas blast. The effect of the inductor continues now unabated and more negative ions are continually formed and immediately carried along the tube. There obtains therefore under these conditions, i. e., with a circulating gas, a continuous stream of electric charges of one sign, or an electric convection current, passing along the length of the tube.

In order to make this current available it is only necessary to insert the collecting electrode at some point in the stream beyond the inductor, to which collecting electrode the gas ions (charged particles) will give up their charges.

An important point is to be noted in connection with the stream of charges. Since the positively charged inductor exerts an attractive force on the negative ions in the stream, against which attractive force the ions are drawn away, work must be done, i. e., energy must be expended, and this work must appear as increased electrical energy and therefore also increase potential, of the charges as they travel along the tube. Also, as the collector charges up, it will exert a repulsive force on the similarly charged oncoming ions, against which repulsive force the ions must be moved, which means that additional energy must be expended or work done to bring the ions up to the collector. All this work, it is readily seen, is done by the gas blast, since it propels the ions up the tube against the forces exerted on them by inductor and collector.

A disadvantage of the simple form of machine just described, namely, wherein the inductor is given an initial charge, is that, due to the leakage which inevitably occurs in practice due to imperfection of insulating materials, the charge originally given to the inductor may gradually leak away, so that the inductor would have to be frequently recharged. This condition can be easily remedied, however, by permanently connecting the inductor to a source of constant potential as the battery, generator, etc., indicated in Fig. 1 at 23, which maintains the potential, and therefore also the charge, of the inductor at a constant value, in spite of the leakage, which always occurs in practice.

From a certain point of view, to be immediately set forth, the two simple forms of machines just described may be called voltage multipliers. When the ions are very close to the inner electrode they have approximately the potential of this electrode, and since between the inductor and the ionizing electrode a source of potential is inserted, the potential difference between the ions and the inductor, just as the ions leave the ionizing electrode, will be the voltage of this source. However, as stated above, in order to draw the ions up the tube against the attraction of the oppositely charged inductor and the repulsion of the similarly charged collector, work must be done, and this work appears as increased electrical energy and therefore also increased potential of the charges with respect to the inductor.

As the ions arrive at the collecting electrode then, they will be at much higher voltage relative to the inductor than when they left the ionizing electrode, and, consequently, the voltage of the collector will become much larger in magnitude than the voltage applied between inductor and ionizing electrode. Hence it may be said that the machine multiplies the applied or input voltage. In particular, it raises the voltage (output voltage) of the collector to a definite multiple of that applied between the inductor and ionizer; it cannot raise it indefinitely, because as the collector charges up it will counteract the effect of the inductor on the ionizing electrode, in particular its effect of producing ionization at the ionizing electrode, and when the collector has sufficient voltage it will hold the inductor in balance, at which point the charge current along the tube is greatly reduced and the system comes to a state of dynamic equilibrium.

It is seen that the machine is in fact an electric generator, since it converts mechanical energy into electrical energy. In particular, it is an electrostatic generator, because the conversion of energy occurs primarily through the medium of electrostatic fields. By an electrostatic field is meant simply a region in which electrostatic forces, forces of attraction or repulsion, are exerted on charged particles. In my machine in particular, an electric field exists in the insulation tube tending to oppose a movement of ions in the direction from inductor to collector, and by the gas blast the ions are moved against this field, or up the grade of potential, against these electrostatic forces or against the electrostatic field.

Figures 4, 5:
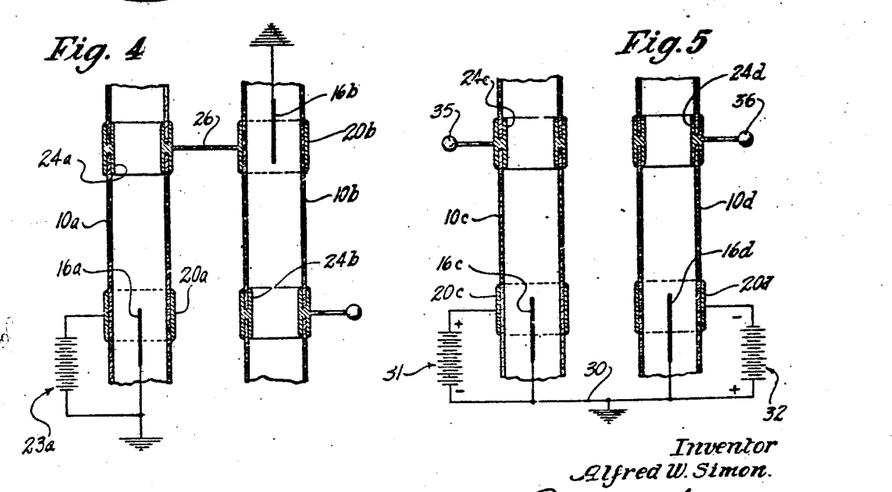
Fig. 4 is a diagram of a double unit voltage multiplier.
Fig. 5 is a diagram of a modified double unit voltage multiplier.

In order further to increase or multiply the voltage, two or more such machines as have now been described may be connected electrically in series, or combined into a single machine. For instance, as shown in Fig. 4, a unit consisting of tube 10a, electrode 16a, inductor 20a and collector 24a, is connected in series with a unit consisting of tube 10b, electrode 16b, inductor 20b and collector 24b. The electrode and inductor of the first machine are shown potentiated by a battery 23a. The potential of collector 24a of the first machine is carried by a wire 26 and impressed on the inductor 20b of the second, so that the second starts with an initial charge equal to the final charge of the first. It is evident that this process of adding series units may be repeated as many times as desired.

With regard to the polarity or sign of the charge of the various elements, if the inductor of the first is charged positively, i. e., if the positive terminal of the source of potential is connected to this inductor, the ions leaving the ionizing electrode and carried by the gas blast will of course be negative, hence the collector will also be negative. Taking into account both voltage and polarity, under these conditions the collector of the first machine will assume a larger negative voltage than the positive voltage impressed on the inductor. In the second machine the ions carried by the gas blast are positive, since the inductor of this machine is negative, hence the collector of the second machine will be positive, and the voltage of the second collector will reach a much higher value than that of the first collector. The process, of course, can be repeated by adding another unit, and so on until any desired voltage has been attained.

Two units can also be so arranged in a system that the collector of one shall be positive and that of the other negative, as in Fig. 5. As there indicated, the two electrodes 16c and 16d of tubes 10c and 10d are connected by a grounded conductor 30. The negative side of a battery 31, or other source of electrical energy, is connected to electrode 16c, and the positive side to the corresponding inductor 20c; while the positive side of a similar source of electrical energy 32 is connected to electrode 16d, the negative side being connected to the corresponding inductor 20d. The output potential is received across discharge balls 35 and 36 of collectors 24c and 24d, respectively, collector 24c and ball 35 being negative, and collector 24b and ball 36 being positive, as will be apparent.

Figures 6, 9:
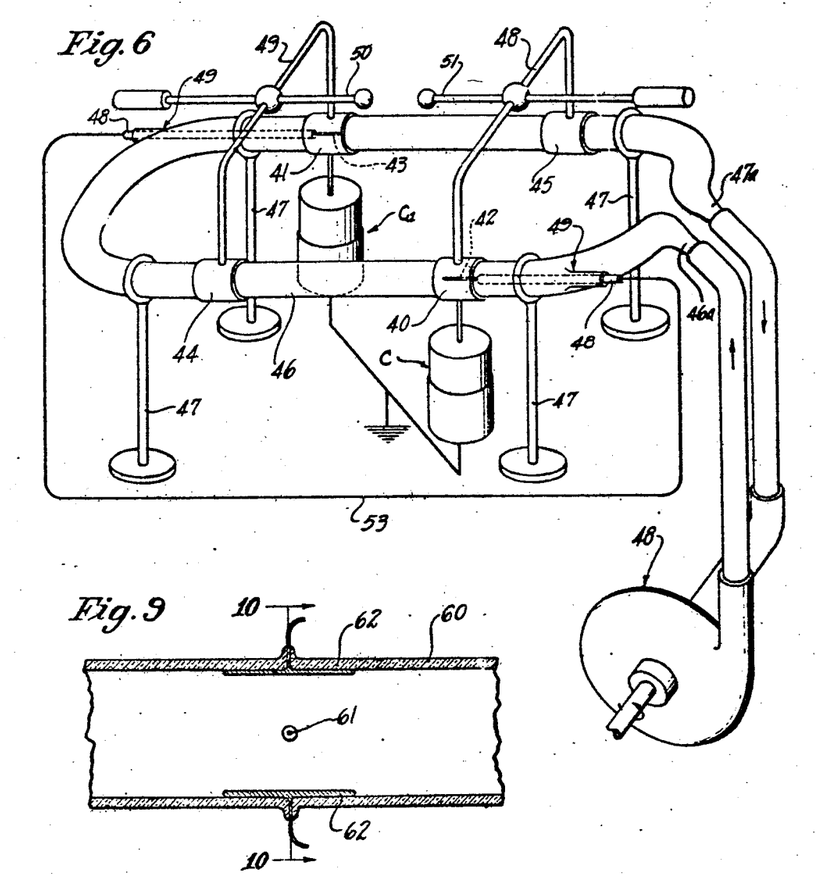
Fig. 6 is a perspective view of a closed system static machine in accordance with the invention.
Fig. 9 is a longitudinal detail section of a rectangular tube having a modified electrode and inductor arrangement, being a view taken on line 9—9 of Fig. 10.

Another application of the principle of my invention is shown in Fig. 6. This machine is bi-symmetric, having two inductors 40, 41, two ionizing electrodes 42 and 43, and two collectors 44 and 45, arranged in the order shown in a single closed dielectric tube 46, in the present instance bent into a double or loop form as illustrated. The tube is here shown as supported on insulating stands 47. The electrode supports 48 may be mounted as at 49 in the side walls of the dielectric tube at its end curves, so as to extend axially down the tube (see Fig. 7). The inlet end 46a of the tube is connected with the discharge side of a blower, conventionally indicated at 48, and the outlet end 47a of the tube is connected to the intake of the same blower, the tube and blower thus forming in this case a closed ring circulation system. Thus the blower will continuously circulate the carrier gas in the direction from the ionizing electrode 42 to the collector 44, to the ionizing electrode 43, to the collector 45, thence through the blower and back to the ionizing electrode 42, and then again through the same cycle. The first inductor 40 and the second collector 45 (in the order of gas circulation) are connected by a conductor 48, and the second inductor 41 and the first collector 44 are connected by a conductor 49, said conductors being provided with rods and discharge balls 50 and 51, respectively. The two ionizing electrodes are connected together by a conductor 53. If the inductor 40 has now a positive charge, the same action as already described in the case of the simple machine of Fig. 1 will take place between the inductor 40, the ionizing electrode 42, and the collector 44, that is, the positive inductor 40 will produce ionization at the surface of the ionizing electrode 42, negative ions being produced and carried to the collector 44, which then charges up negatively. The voltage of the collector 44 is then impressed on the inductor 41, which thus becomes negatively charged, and draws positive ions out of the ionizing electrode 43. These positive ions are then carried to the collector 45, charging it positively, and the voltage so produced is in turn impressed on the inductor 40, raising it to a higher voltage than it originally had. This higher voltage in turn draws a greater negative charge current out of the ionizing electrode 42 causing the collector 44 to rise to still higher negative voltage, which is impressed on the inductor 41 so that the latter in turn draws a greater current out of the electrode 43, and so on. It will be seen that by this process the voltage of the collectors and of the discharge balls must continually and rapidly increase and the current carried by the gas blast becomes continually larger.

Of course it will be readily seen that if the inductor of the simple machine of Fig. 1 is charged negatively instead of positively as we assumed in the explanation of its action, the same action will take place except that the polarity of the elements is everywhere opposite that given. In particular, if the inductor 20 of the machine of Fig. 1 is charged negatively, positive ions are produced near the surface of the ionizing electrode 18 and are carried up the tube and charge the collector 24 positively. Similarly in the machine just described, namely that of Figs. 6 and 7, if the polarity of the inductor 40 is opposite to what has been assumed, the action of the machine will be exactly the same except that the polarities will be everywhere reversed.

Figure 7:
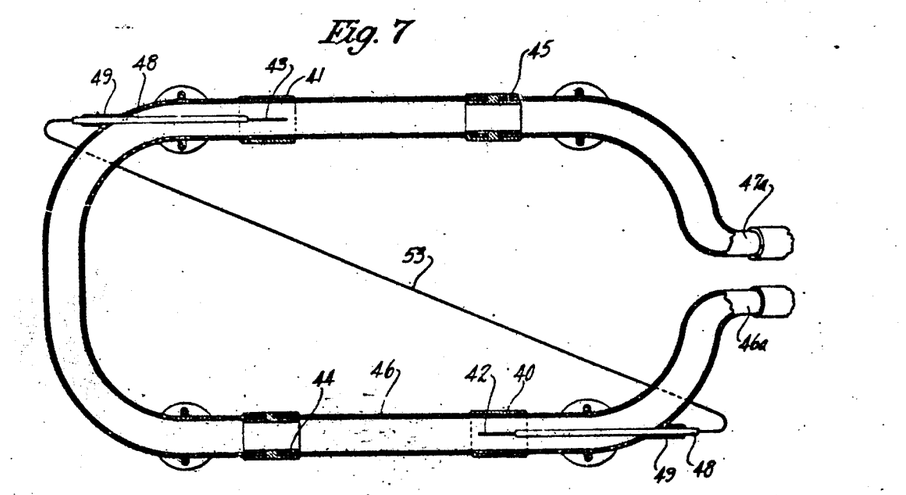
Fig. 7 is a central sectional view of the tube of the machine of Fig. 6.

It will be readily appreciated that the underlying fundamental is the same in the voltage multiplier type of machine as shown in Figs. 1 to 5 and the static machine proper as shown in Figs. 6 and 7. The difference between the two lies in the arrangement in Fig. 6 whereby the last collector of a series like that of Fig. 4 charges the first inductor of the series. The static machine proper, as the machine illustrated in Figs. 6 and 7 may be called, can be converted into a two unit multiplier by impressing a constant source of potential on the inductor 40, and breaking the connection between the inductor 40 and the collector 45, or it can be converted into a single unit multiplier by also breaking the connection between the collector 44 and the inductor 41. In the first case (connection between 40 and 45 broken and voltage impressed between 40 and 42) the voltage impressed on 40 would be multiplied in the first unit, and the voltage generated by the first unit would be impressed on the second, which in turn would multiply again the voltage so impressed. In the static machine, on the other hand, the voltage initially impressed on one inductor is multiplied in the first unit, the voltage so generated in the first unit is impressed on the second, which in turn multiplies it again, and in addition the voltage obtained in the second is now reimpressed on the first to be further multiplied, and so on indefinitely. It is seen that the last type of machine must then step up indefinitely the voltage impressed originally on the first unit. In practice of course a limit is set to the obtainable voltage, the limit to the voltage for the machine of Figs. 6 and 7 being established by the arc-over voltage from inductor to electrode wire.

Both the voltage multiplier and the static machine convert mechanical energy into electrical energy through the medium of electrostatic fields. In both cases in the machines here disclosed the electric charges are moved by the gas blast against the electrostatic forces of attraction and repulsion exerted on them; the fundamental principle is therefore the same, both belonging to the genus of electrostatic generators.

While in Figs. 1, 4 and 5 I have shown the gas passing to the open air after leaving the collector, an alternative arrangement, particularly if a gas other than air is used or if air or other gas under pressure for better insulation is used, is to make the circulation closed, as in the arrangement of Fig. 6, the same gas being continually circulated. With regard to all the machines of the types here described, whether closed or open circulation is used is entirely optional; whether in particular in multiple units (by a unit should be understood the combination of inductor, ionizing electrode, and collector) the gas is circulated in succession past all the units and then to the open air (open circulation), or back again to the first (closed circulation), or whether each unit has separate streams in turn either open or closed.

With regard to the gas stream tube it may be pointed out that it need not be of insulating material throughout its entire length; only that portion between inductor and collector and a sufficient length on either side of these elements to properly insulate them need be of insulating material. At some point in this tube the device which circulates the gas is attached, preferably of course as far away as practical from those elements which are at high potential.

Figure 8:
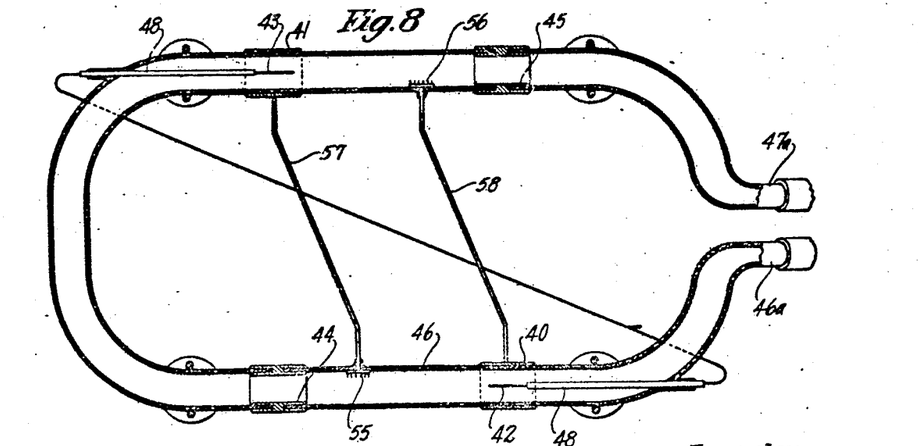
Fig. 8 is a view similar to Fig. 7 but showing a modified arrangement of the machine.

A disadvantage of the machine of Fig. 6 is that the inductors are charged directly from the collectors, which in practice would be connected also to the load; in the event that the load becomes short-circuited the inductors would be discharged and the action of the machine would cease. Also if a low resistance load were connected across the collectors, the voltage across the inductors would be lowered and the effective current reduced. In order to obviate these difficulties it is better to employ separate collectors for the inductors and the load, a portion of the charge or current flowing in the tube being appropriated to maintain the charge of the inductors while the remainder is collected and flowed through the load. This can be accomplished by inserting two additional small auxiliary collecting or "appropriating" electrodes or combs 55 and 56, one in each stream at a point preceding the collector proper, as shown in Fig. 8. The auxiliary or "appropriating" electrode of each unit is connected by a suitable conductor, as conductors 57 and 58, to the inductor of the other unit, and maintains the charge of this inductor irrespective of what may happen in the load circuit, which is then simply connected between the two main collectors. This machine has a further advantage over the machine of Figs. 6 and 7 in that the inductor is not given the high potential of the collector on the other side of the machine, which greatly lessens the tendency for arc-over to occur between inductor and electrode, and this means that the machine can charge up to a much higher voltage.

As in static machines known to the prior art, condensers may be connected in the system to steady the current flowing through the load or store up charges where it is desired to discharge large quantities of electricity at intervals. For instance, in Fig. 6, Leyden jar condensers C and C₁ are shown connected to inductors 40 and 41, respectively, the other sides of the condensers being grounded. In Fig. 8 the condensers could be connected to the main collectors 44 and 45.

While in the machines described so far the ionizing electrode has been described as a wire affixed centrally in the insulating tube and parallel to the axis of the tube, this arrangement has the drawback that the permissible length of the wire is limited and therefore the current drawn from it is relatively small, for a reason now to be made clear. The ions after they leave the ionizing electrode are continually acted on by three forces: One, that due to the electric field between ionizer and inductor, which force urges them in a direction from ionizer to inductor, i. e. in a direction transverse to the direction of circulation of the gas; second, that due to the streaming gas which urges them along the stream; and a third force, that due to the electric field between collector and ionizer, which force tends to urge the ions in a direction parallel to the stream but opposite to it.

The gas ions, of course, will move in obedience to all these three forces. The resultant of these three forces can be divided into two components, one parallel to the direction of the circulation, the other perpendicular or transverse to it. If the second of these is much greater everywhere than the first, the ions will be urged across the tube and lodge on the wall next to the inductor; but if the first component is everywhere the greater, the ions will be carried up the axis of the tube as desired. Now, any ion will travel in a curved path in obedience to these forces, and the effective length of the ionizing wire will be determined or limited, for a given velocity of gas blast, by the course taken by the ions leaving the most advanced point (with respect to the approaching gas) of the ionizing wire. If this course is such that the ions reach the wall of the tube before they get out of the influence of the field between ionizer and inductor (for example the course $a$ of Fig. 1), then the wire must be shortened; if they take a course such as $b$ of the figure, the wire is of satisfactory length.

Figure 10:
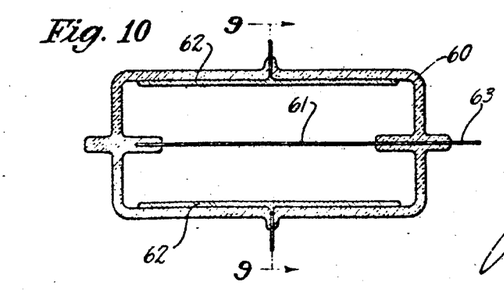
Fig. 10 is a transverse section taken on line 10—10 of Fig. 9.

Another arrangement involves an ionizing wire transverse to the direction of circulation, this being of considerable advantage since then the wire can be made as long as desired and therefore the ionizing current made as great as desired. This is effected in the arrangement of Figs. 9 and 10, by making the cross section of the insulating tube 60 rectangular instead of circular, the transverse ionizing electrode or wire 61 being placed centrally and parallel to the long axis of the rectangle. Under these conditions the inductors would preferably take the form of parallel plates 62 placed parallel to the wire at opposite sides of the tube, here being shown within the walls of the tube. Placing the inductors inside the tube walls is of advantage in preventing the tube from charging up, and may be preferable in all of the other forms of the invention instead of the outside inductors illustrated in some cases. Of course the cross section of the tube need not be rectangular, but may be of other suitable configuration. The electrical connections can be either taken out by wires running backward against the direction of circulation, or the charging electrode can be continued out through the side of the tube as at 63 and the inductor plates provided with connections through the tube wall as at 64 in Figs. 9 and 10.

For still larger currents a number of any of the described units are placed in parallel electrical relation. It is obvious that such arrangement may be used with any of the forms of generator described above.

There are some advantages to be gained in the best choice of gas to be used in the system. The mobility of gas ions in air is so great that, with the speeds induced by the field strengths which may be used, there may be some difficulty in sweeping the ions along the tube. However, there are certain gases, notably sulphur dioxide and ammonia, in which the mobility of the ions is greatly reduced, and the use of such gases reduces any difficulty due to high velocity of ions in the electric field. I may therefore prefer to utilize a blast consisting of a gas in which the ions have low mobility. It may also be noted that the gas is under pressure due to the action of the blower, and that, especially in the closed ring form of the machine (Fig. 6, for instance) this pressure is easily maintained at a substantial value. This pressure also has a tendency to reduce mobility of the ions through the gas, and excessive ionic mobility may therefore be controlled to a large extent through increase of the gas pressure.

The invention has so far been described with gas ions chiefly in view as carriers for the electrical charges. I also contemplate other carriers for the charges, among which are to be mentioned, first, finely divided solid particles, as pith balls, sand, rouge, or any material sufficiently light to be circulated by a blast, and second, liquid particles, as non-conducting mists, atomized oils, etc. The finely divided solid matter, or liquid "mist", as the case may be, is passed for instance through the corona discharge between charged electrode and inductor, and so charged, thus producing electrically charged particles or ions of considerably larger size than the previously mentioned gas ions; and the charged particles are then carried to the collector by the blast in the same manner as are the gas ions in the first described form.

For instance, in using an oil mist I have an artificially created carrier of low mobility as compared with gas ions, since the charge carrying oil droplets, while they may also be referred to as ions, are of very much larger size than molecular gas ions, and therefore encounter more resistance in moving through the air from ionizer to inductor. Moreover, the oil droplets are more readily propelled by the air blast because of their larger size.

Figure 11:
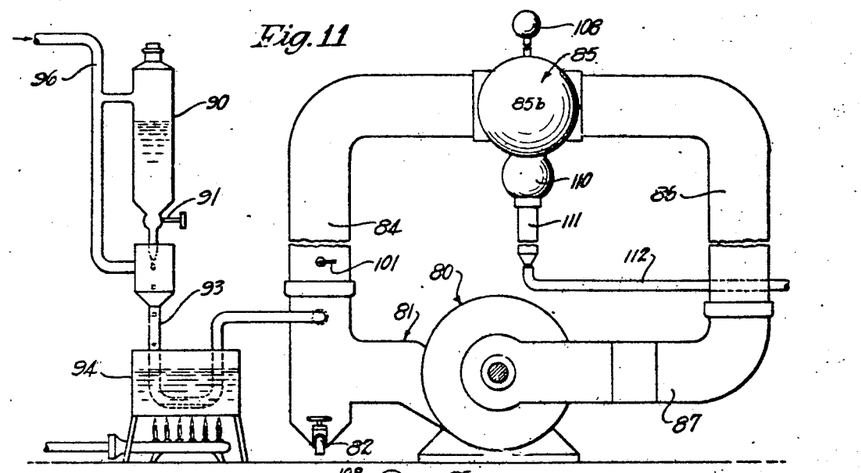
Fig. 11 is a view of a modified form of machine.
Figure 12:
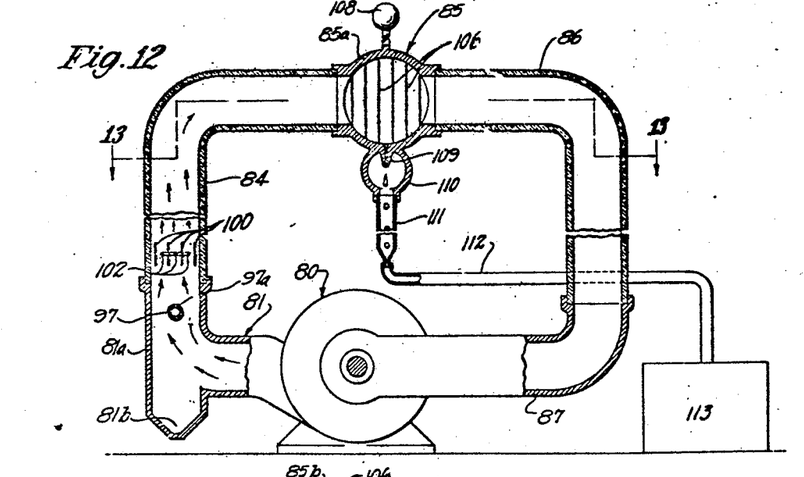
Fig. 12 is a vertical longitudinal section of the machine of Fig. 11.
Figure 13:
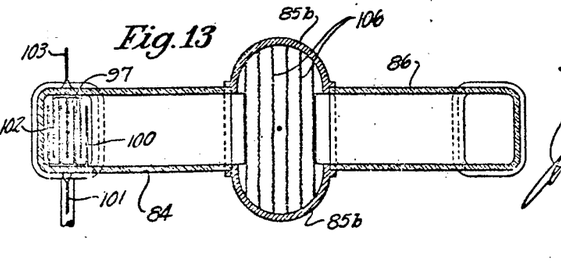
Fig. 13 is a section taken on line 13—13 of Fig. 12.

Figs. 11 to 13 show somewhat diagrammatically a machine adapted for use with a liquid mist, being designed particularly for use with atomized oils. Numeral 80 designates a blower adapted to furnish a circulating blast through the system. The blower is shown discharging through a fitting 81 having a vertically extending part 81a, the lower end of the latter forming an oil collecting well 81b having a liquid drain cock 82, and the upper end being connected with an insulation tube 84. Tube 84 leads to one side of a hollow collector member 85, and to the other side of the collector is connected a second insulation tube 86 which leads to an inlet fitting 87 on blower 80. Thus blower 80 sets up a closed circulation blast through members 81, 84, 85, 86, and 87.

The oil mist is introduced to the system from a suitable oil mist generator or atomizer, a suitable laboratory form of which is shown in Fig. 11. Oil within reservoir 90 discharges past a needle valve at 91 into one leg of U-tube 93 which is heated in a lead bath 94, the latter being maintained for instance at a temperature of approximately 480° C. Air or any suitable gas from a supply tube 95 is passed through U-tube 93 and carries the oil mist thereby produced up the discharge leg of the U-tube and into a perforated pipe 97 mounted transversely across fitting 81a directly below insulation tube 84. The oil mist is discharged upwardly from perforations 97a in said perforated pipe and is carried by the blast rapidly around through tube 84, collector 85, and tube 86 to the blower, and is then continuously recirculated by the blower in the ring path described.

The inductor is here shown in the form of a plurality of parallel vertical plates 100 mounted in the lower end of a vertical section of insulation tube 84, directly over perforated pipe 97, said plates having an electrical connection 101 extending through the wall of tube 84 (Fig. 13). Between plates 100 are horizontally extending ionizing or corona electrode wires 102, said wires having an electrical connection 103 extending through the wall of tube 84. The inductor plates may of course be potentiated with reference to electrode wires 102 in the same general way as described in connection with the previously mentioned forms of the invention, the relations of distances of separation and relative areas of plates 100 and wires 102 and the potential difference between them being arranged to give the desired charge to the oil mist travelling past the electrode wires between the inductor plates. The oil mist receives its charge by encounter with gas ions which are produced as before in the high gradient field or corona zone about the electrode wires, the oil droplets of one polarity being attracted to the corona wires while those of opposite polarity are swept along by the blast.

The oil droplets thus charged predominantly to one polarity are discharged from tube 84 into and through the chamber of hollow collector 85. This collector is shown in Figs. 12 and 13 to consist of a cylinder 85a connected at its opposite sides to dielectric tubes 84 and 86 and provided with hemispherical ends 85b, and a plurality of vertical parallel screens 106 arranged therein transversely of the blast, said screens being adapted to take the electrical charge from the oil droplets passing therethrough. A usual discharge ball 108 is shown mounted on the collector. A considerable portion of the oil droplets will of course not be able to pass through the collector, but will condense on the screens 106 and will find their way to the bottom of the cylindrical body of the collector. In the form shown, this accumulation of oil is discharged through a nipple 109 arranged within a sphere 110 formed integrally with collector body 85. To the lower end of sphere 110 is connected an insulation tube 111, the latter being connected in turn to a suitable oil line 112 leading to an oil reservoir 113 which may be at ground potential. Sphere 110 is substantially a closed conductor, and since there is no charge within a closed conductor, the oil discharged from nipple 109 within the sphere leaves the collector without carrying away a charge. The insulation tube 111 insulates the collector from grounded parts of the system.

It will be obvious that any of the forms of the invention previously described, whether static machines or voltage multipliers, are adaptable to operation with liquid mists, finely divided solid particles, or gaseous ions, the requirement being simply that there be provided small particles adapted to be moved along in a confined stream by means of a gas blast and adapted to take an electrical charge. For the purpose of the claims all such charge bearing mediums will be referred to by the generic expression dielectric fluid, that expression implying both, or either, the gas blast and the finely divided solid or liquid particles suspended therein, where the latter are used.

While I have for illustrative purposes principally mentioned producing ionization or charging of particles by use of a corona discharge, it is to be understood that any other method of ionizing or producing charged particles to be carried by the gas blast to a collector is contemplated within the broad scope of the invention. For the purpose of the claims the expression, means for producing electrically charged particles, contemplates any such ionizing or charging means.

It will be understood that the drawings and description are merely illustrative of and not restrictive on the invention considered in its broader aspects, and that various modifications in the design and arrangement of the illustrative embodiments may be made without departing from the spirit and scope of the appended claims.

I claim:
1. A double-sided electrostatic generator, each side of said generator including means providing a traveling electric-charge carrier, an inductor and an ionizing electrode adapted to charge said carrier, a collector adapted to take electric charge off said carrier at a point removed from said inductor in the direction of carrier movement, and a charge appropriating electrode adapted to take charge from the carrier at a point between the inductor and collector, and an electric conductor connected between the appropriating electrode of each side of the generator and the inductor of the other side of the generator.

2. An electrostatic generator, comprising a dielectric conduit, means for forcing a blast of dielectric fluid through said conduit, an inductor and an ionizing electrode associated with said conduit and adapted to charge said dielectric fluid predominantly to one polarity, a collector in said tube removed in the direction of fluid flow from said inductor and ionizing electrode, another ionizing electrode and inductor associated with said conduit beyond said collector, said second ionizing electrode and inductor adapted to charge the dielectric fluid predominantly to one polarity, and another collector in said tube removed in the direction of fluid flow from the second ionizing electrode and inductor, an appropriating electrode in the conduit between the first ionizing electrode and inductor and the first collector adapted to take charge from the fluid, an electrical connection between said appropriating electrode and the second inductor, a second charge appropriating electrode in the conduit between the second ionizing electrode and inductor and the second collector adapted to take charge from the fluid, and an electrical connection between said second appropriating electrode and the first inductor.

3. The herein described method, that includes creating and maintaining a confined current of dielectric fluid, creating in the path of movement of said fluid an electrostatic field of gradient falling materially from one side to the other and of sufficiently high gradient at the high side to produce corona discharge without simultaneous arcing, and such that particles comprising said fluid are charged positively and negatively and the particles of one polarity are attracted to the high gradient side of the electrostatic field and held back against the current of dielectric fluid, the electrostatic field being of sufficiently low gradient at the low side that the attraction of the oppositely charged particles thereto is overcome by the force of the current of dielectric fluid and such particles are carried on by said current, and taking the charge off the latter fluid particles at a point in the path of the dielectric fluid current beyond the point of charging.

4. The herein described method, that includes creating and maintaining a confined current of dielectric fluid, introducing to the current of dielectric fluid a liquid mist, creating in the path of movement of the mist-laden fluid an electrostatic field of gradient falling materially from one side to the other and of sufficiently high gradient at the high side to produce a corona discharge in the mist-laden fluid without simultaneous arcing, whereby the fluid is ionized positively and negatively, the fluid ions of one polarity are attracted to move out of the fluid current in the direction of the high gradient side of the field and the particles of liquid mist are charged by encounter with the remaining ionized particles, particles of liquid mist thus charged to said one polarity being attracted by the high gradient side of the electrostatic field and tending to be held back against the fluid current by the relatively high intensity of that part of the field, and the low gradient side of the electrostatic field being of such lower intensity as to permit the oppositely charged particles of liquid mist which are attracted thereto to be carried beyond the electrostatic field by the force of the current of dielectric fluid, and taking the charge off the latter particles of mist at a point in the path of the dielectric fluid current beyond the point of charging.

5. In an electrostatic generator, the combination of a dielectric conduit, means for forcing a current of gas through said conduit, a pair of electrodes associated with said conduit adapted to take a difference of potential and to produce an electrostatic field within said conduit, one of said electrodes embodying a relatively small wire and the other embodying a relatively large plate having a relatively large radius of curvature, means impressing a difference of potential across said electrodes sufficient to produce ionization of the gas in the electrostatic field about the small wire electrode, whereby gaseous ions predominantly of one polarity are produced between said electrodes, means for introducing a finely divided suspended liquid mist into said conduit at a point ahead of said electrodes, all in such manner that particles of such mist are encountered and charged by the gaseous ions predominantly of one polarity in the electrostatic field between said electrodes, and a charge collector in said conduit beyond said pair of electrodes in the direction of gas flow.

6. An electrostatic generator, comprising a dielectric conduit, means for forcing a blast of dielectric fluid through said conduit, an inductor and an ionizing electrode associated with said conduit and adapted to charge said dielectric fluid predominantly to one polarity, a collector in said tube removed in the direction of fluid flow from said inductor and ionizing electrode, another ionizing electrode and inductor associated with said conduit beyond said collector, said second ionizing electrode and inductor adapted to charge the dielectric fluid predominantly to one polarity, another collector in said tube removed in the direction of fluid flow from the second ionizing electrode and inductor, an electrical conductor connected between the first mentioned inductor and the second mentioned collector, and another electrical conductor connected between the first mentioned collector and the second mentioned inductor.

ALFRED W. SIMON.